Oct. 11, 1960  E. E. HITE  2,955,322
APPARATUS FOR FORMING A LINER HAVING A RESILIENT
RING-SHAPED GASKET ANCHORED THEREIN IN THE
SOCKET OF A PIPE MEMBER
Filed July 2, 1958

INVENTOR.
Earl E. Hite
BY
HIS ATTORNEYS

United States Patent Office 2,955,322
Patented Oct. 11, 1960

2,955,322

APPARATUS FOR FORMING A LINER HAVING A RESILIENT RING-SHAPED GASKET ANCHORED THEREIN IN THE SOCKET OF A PIPE MEMBER

Earl E. Hite, Toronto, Ohio, assignor to Kaul Clay Company, Toronto, Ohio, a corporation of Ohio Filed July 2, 1958, Ser. No. 746,171

1 Claim. (Cl. 18—36)

This invention relates to apparatus for forming a liner having a resilient ring-shaped gasket anchored therein in the socket of a pipe member.

In my copending application Serial No. 746,172, filed July 2, 1958, there is described and claimed a pipe joint made by assembling the spigot end of a pipe member in the socket end of an adjacent pipe member. The spigot end has a collar of rigid material secured to it and the socket is lined with a liner of rigid material. A resilient ring-shaped gasket is anchored to the liner in the socket, the gasket forming a seal between the two pipe members.

The present application relates to an apparatus for forming the liner in the socket of the pipe member, the liner having a resilient ring-shaped gasket anchored therein. It also relates to a method for accomplishing the same purposes.

In the accompanying drawings which illustrate a preferred embodiment of my invention, Figure 1 is a longitudinal section through the spigot end of one pipe member and the socket end of an adjacent pipe member, the two pipe members being disassembled;

Figure 1:
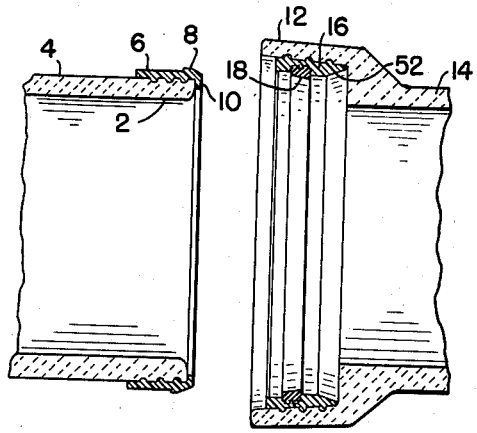
Figure 2:
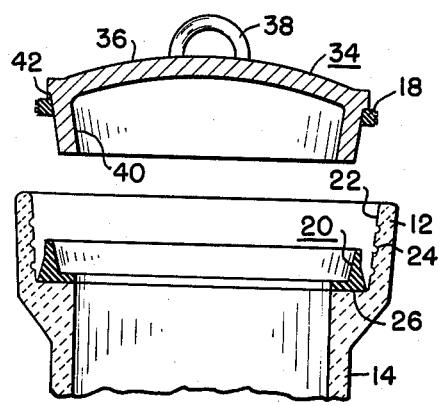
Figure 2 is a vertical longitudinal section through the socket end of a pipe member with a collapsible casting ring in place within the socket and also showing a rigid die having a resilient ring-shaped gasket mounted on it, this figure illustrating an early stage of carrying out the method of the present invention.

Referring more particularly to the accompanying drawings, in Figure 1 there is shown the spigot end 2 of a pipe member 4, the end 2 being provided with a collar 6 of rigid material secured to the end 2. The collar 6, at its inner end, has an annular shoulder 8 and an inturned lip 10. The bell or socket end 12 of a pipe member 14 is provided with a rigid liner 16 cast in place by a method hereinafter more fully described. A resilient ring-shaped gasket 18 is anchored in the liner 16.

In forming the liner 16 with the resilient ring-shaped gasket 18 anchored therein, the following steps may be employed.

Step 1.—A collapsible casting ring 20 is placed in the socket end 12 of the pipe member 14. The socket end 12 has a side wall 22 provided with annular grooves 24, the bottom of the socket being formed by a wall 26. The collapsible casting ring is preferably made of rubber, neoprene or other resilient material but may be made of paper or any other material which is destructible or collapsible so that it can be removed from the socket of the pipe member 14 after the casting operation has been performed. In the embodiment shown, the collapsible casting ring 20 has an annular base 28 and an upstanding peripheral flange 30 and the lower part of the flange 30 is flared radially outwardly to form a flared portion 32.

Step 2.—The resilient ring-shaped gasket 18 is placed on a die designated generally by the reference numeral 34. The die comprises a cover or top portion 36 which is circular in plan view, the cover being provided with a handle 38. The die has a circular flange or side walls 40 which taper toward the open end of the die. The cover 36 extends outwardly beyond the side walls 40 to form a shoulder 42. The resilient gasket 18 is placed on the side walls 40 in contact with the shoulder 42.

Figure 3:
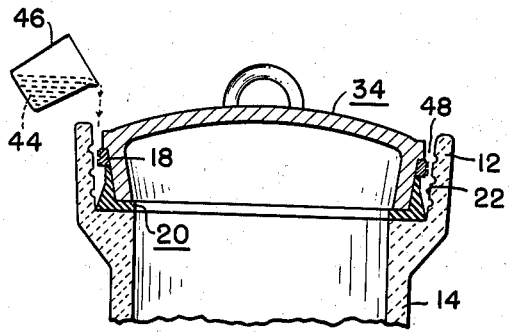
Figure 3 is a vertical longitudinal section illustrating the stage in which liner material is being cast to form the liner in the socket end of a pipe member.

Step 3.—The die 34 with the resilient gasket 18 on it is then inserted into the casting ring 20 as shown in Figure 3 and liner material 44 is poured from a container 46 into the mold cavity 48 formed between the wall 22 of the socket end 12 and the assembly of die 34, gasket 18 and casting ring 20. The liner material 44, after being cast into the mold cavity, is allowed to harden, thereby forming the liner 16 with the resilient gasket anchored in it.

Figure 4:
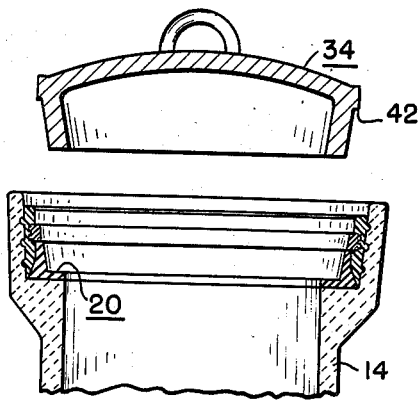
Figure 4 is a view similar to Figure 3 illustrating the stage at which the liner material has been poured and the die has been removed.

Step 4.—The die 34 is then removed from the collapsible casting ring 20 as shown in Figure 4.

Step 5.—The casting ring 20 is then removed from the socket of the pipe member 14 by collapsing it if the casting ring is made of resilient material or by breaking it if it is made of destructible material.

The above method may be modified by placing the gasket 18 on the die 34, then placing the casting ring 20 on the die, and thereafter inserting the assembly of die, gasket and casting ring into the socket of pipe member 14.

Figure 6:
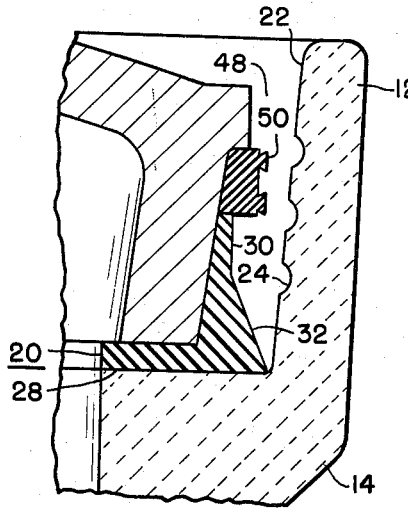
Figure 6 is a partial view similar to Figure 3 but on an enlarged scale.
Figure 5:
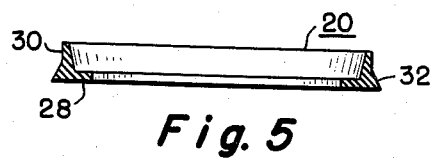
Figure 5 is a vertical section through a collapsible casting ring.

The resilient gasket 18 is provided with keying lugs 50 which aid in anchoring the gasket in the liner 16. The liner 16, as shown in Figure 1, has a flared portion 52 which provides a space for the reception of the annular shoulder 8 on the collar 6 of the spigot end 2 so as to allow slight relative axial displacements of the two pipe members. The flared portion 32 of the collapsible casting ring 20, as shown in Figure 6, provides the flared portion 52 of the liner 16 during the casting operation. A casting ring having a flared portion such as the portion 32 shown in Figure 6 could not be withdrawn from the socket of the pipe member 14 after the casting operation unless the casting ring were made of collapsible or destructible material.

The preferred liner material 44 for forming the liner 16 is a mixture of 50% by weight of silica flour and 50% by weight of a liquid polyester resin such as the polyester resin manufactured by Celanese Corporation of America, Newark, N.J., and sold under the trademark "MX-314."

In place of the polyester resin, any other suitable mixture which forms a rigid liner can be used to form the liner 16, as, for example, a mixture of 50% by weight of silica sand and 50% by weight of sulphur. Such mixture is heated to melt it and is then cast to form the liner.

The invention is not limited to the preferred embodiment but may be otherwise embodied or practiced within the scope of the following claim.

I claim:

Apparatus for forming a liner having a resilient ring-shaped gasket anchored therein and extending radially inward therefrom in the socket of a pipe member, which comprises a collapsible casting ring seated on the bottom of the socket and a rigid die having a circular cover and side walls which taper toward the open end of the die, there being a shoulder between said cover and side walls, the lower portions of said side walls fitting in said casting ring and the upper portions of said side walls extending above the upper edge of said casting ring to provide an exposed side wall portion of said die between the upper edge of said casting ring and said shoulder for receiving the resilient ring-shaped gasket when it surrounds said side wall portion and is in contact with said shoulder and the upper edge of said casting ring, the peripheral portions of said cover, side walls and casting ring being spaced from the side wall of said socket.

References Cited in the file of this patent

UNITED STATES PATENTS

| | | |
|---|---|---|
| 1,840,447 | Halstead | Jan. 12, 1932 |
| 2,284,741 | Johnston | June 2, 1942 |
| 2,395,144 | Stivason | Feb. 19, 1946 |
| 2,460,874 | Coberly | Feb. 8, 1949 |
| 2,661,500 | Seymour et al. | Dec. 8, 1953 |

FOREIGN PATENTS

| | | |
|---|---|---|
| 482,581 | Great Britain | Mar. 28, 1938 |